United States Patent
Jagtap et al.

(10) Patent No.: US 9,298,772 B2
(45) Date of Patent: Mar. 29, 2016

(54) SMALL TABLE REPLICATION FOR PARALLELIZED JOIN OPERATIONS

(71) Applicant: Oracle International Corporation, Redwood Shores, CA (US)

(72) Inventors: Unmesh Jagtap, San Jose, CA (US); Thierry Cruanes, San Mateo, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 142 days.

(21) Appl. No.: 13/839,228

(22) Filed: Mar. 15, 2013

(65) Prior Publication Data

US 2014/0280022 A1  Sep. 18, 2014

(51) Int. Cl.
G06F 7/00 (2006.01)
G06F 17/30 (2006.01)

(52) U.S. Cl.
CPC .... G06F 17/30466 (2013.01); G06F 17/30498 (2013.01)

(58) Field of Classification Search
CPC ............... G06F 17/30498; G06F 17/30445; G06F 17/30454
See application file for complete search history.

(56) References Cited

U.S. PATENT DOCUMENTS

| 7,020,661 | B1 * | 3/2006 | Cruanes | G06F 17/30498 |
| 7,278,008 | B1 * | 10/2007 | Case | G06F 12/1036 710/26 |
| 2002/0188600 | A1 * | 12/2002 | Lindsay | G06F 17/30466 |
| 2007/0130110 | A1 * | 6/2007 | Graefe et al. | 707/2 |
| 2008/0193103 | A1 * | 8/2008 | Miyamoto | G11B 27/105 386/241 |
| 2012/0036146 | A1 * | 2/2012 | Annapragada | G06F 17/30283 707/764 |
| 2012/0117056 | A1 * | 5/2012 | Al-Omari | G06F 17/30445 707/714 |
| 2013/0311421 | A1 * | 11/2013 | Erdogan et al. | 707/609 |

OTHER PUBLICATIONS

Yu Xu, et al."Handling Data Skew in Parallel Joins in Shared-Nothing Systems", SIGMOD, Jun. 9-12, 2008, 10 pages.
Nadeem Moidu, "Skewed Join Optimization", Pages, DesignDocs, Jun. 7, 2012, 2 pages.
Hadoop Hive, "Join Syntax", Mar. 10, 2011, 4 pages.
"History, focus, and technology of HP Neoview", Oct. 2, 2008, 11 pages.
HP Press Release, "HP Devlivers Real-time Business Information with Enhanced Neoview Capabilities", Palo Alto, CA, Jun. 2, 2008, 2 pages.

* cited by examiner

Primary Examiner — Tuan A Pham
(74) Attorney, Agent, or Firm — Vista IP Law Group, LLP

(57) ABSTRACT

A method, system, and computer program product for planning relational database joins in systems with multiple parallel computational units. The computer implemented method compiles an execution plan for dissemination to a plurality of execution units where the plan combines a smaller left-side table with a portion of a larger right-side object to reduce system overhead. Upon receiving a request for a join operation comprising left-side table data and right-side table data where the left-side table data is much smaller than the right-side table data, then the method compiles a plan to apportion an entirety of the left-side table data and only a portion of the right-side object to a plurality of computational units. The method continues by sending distribution instructions to respective computational units where the distribution instructions include retrieval of the entirety of the left-side table data with the retrieval of only a portion of the right-side object.

20 Claims, 9 Drawing Sheets

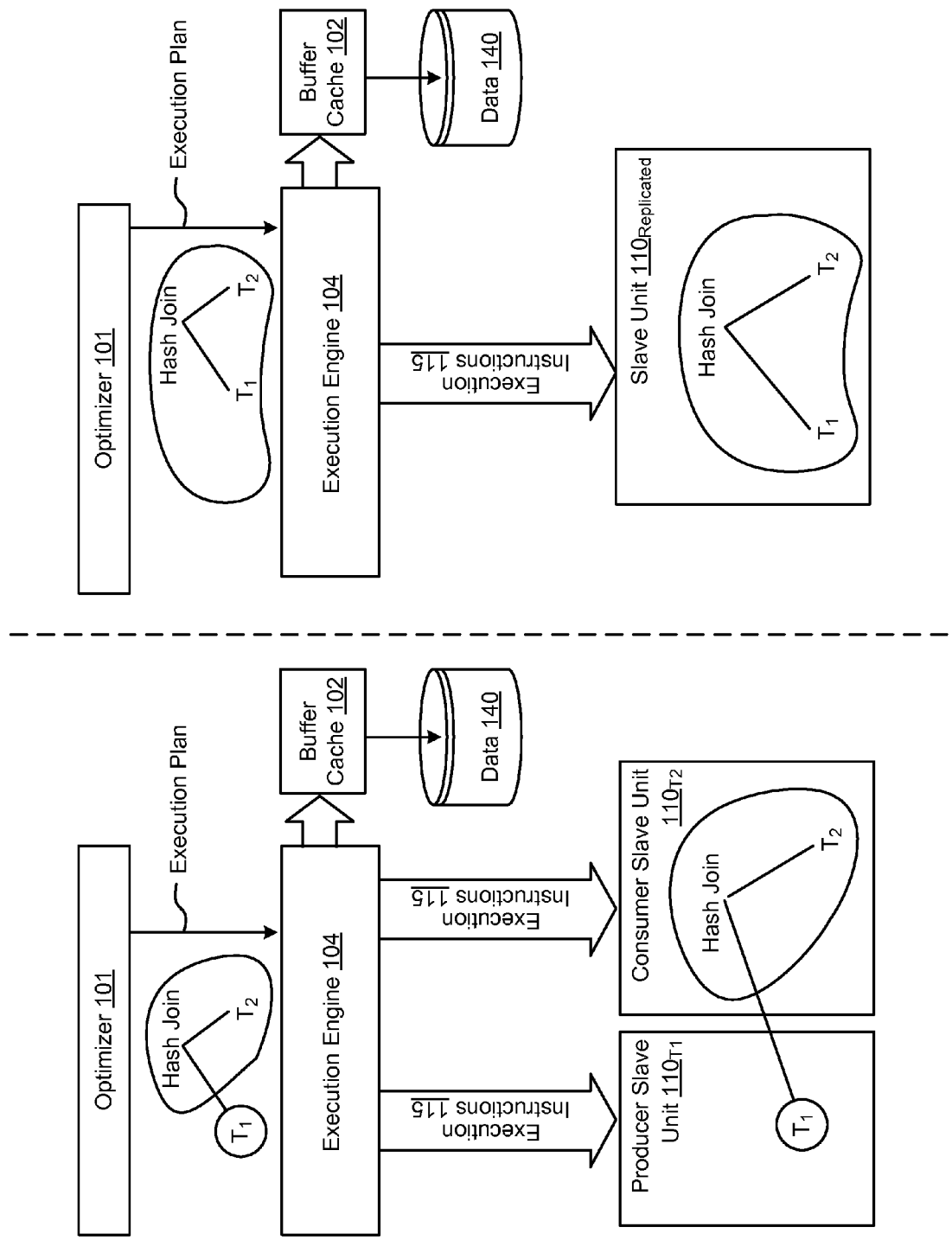

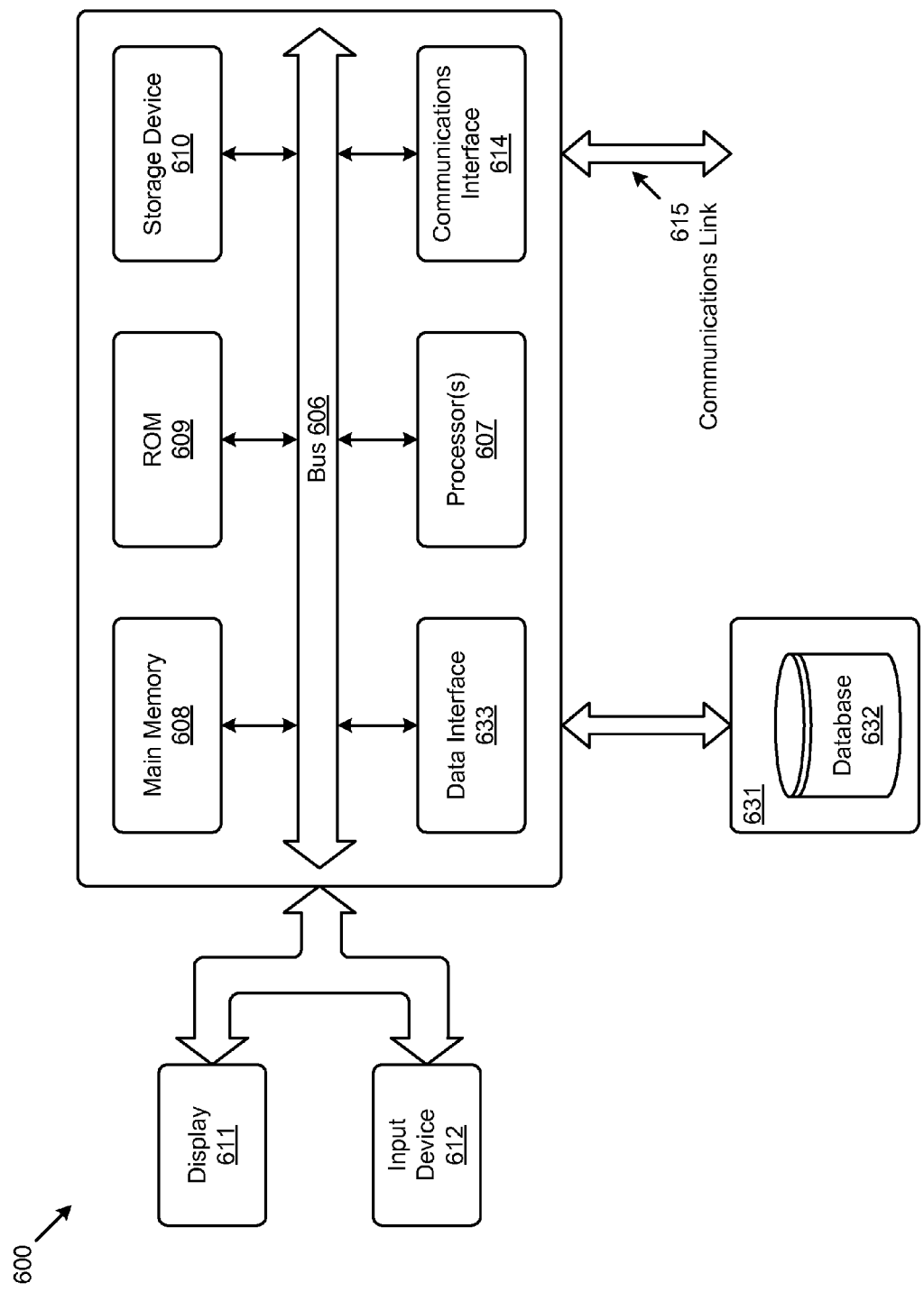

SMALL TABLE REPLICATION FOR PARALLELIZED JOIN OPERATIONS

RELATED APPLICATIONS

The present application is related to co-pending U.S. patent application Ser. No. 13/839,399, entitled "ADAPTIVE SELECTION OF A DISTRIBUTION METHOD DURING EXECUTION OF PARALLEL JOIN OPERATIONS", filed on even date herewith, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of planning relational database queries in systems with multiple parallel computational units and more particularly to techniques for combining a smaller left-side table to a portion of a larger right-side table to reduce data communication protocol overhead.

BACKGROUND

In relational database systems, implementation of the join operator needs to process two tables (e.g., a left-side table and a right-side table). The tables are related in some way, usually based on an association of objects in the left-side table with objects that share a common dimension in the right-side table. In some cases one or both of the tables can be very large, and the join operation can be parallelized. For example, in a system having multiple computational elements, a portion of the tables can be distributed to each one of the multiple computational units, then each unit can perform the portion of the join corresponding to the portion distributed to the respective computational unit.

Depending on the relative sizes of the tables involved in the join, the portions of the constituent tables can be apportioned to the computational units according to an execution plan. For example, given a scenario to execute a parallel join with 10 computational units, and given a join of left side table $T_1 \times 1$ (say of 1 thousand rows) to a right side table $T_2 \times 1$ (say of 1 million rows), one possible plan is to distribute table $T_1$ to all computational units, and then apportion successive tenths of table $T_2$ to each of the 10 computational units. Each unit can perform its respective portion of the overall join, and the results from the individual computational units can be combined to form the overall results of the join.

When the left input of a join is relatively small compared to the right side of the join, the optimizer might determine to broadcast all of the left input to all the computational units performing the join. In some cases this broadcast plan can prove to be a very good plan because there is no distribution of the right side of the join since the same computational units performing the join will also produce the right side of the join. Also, the broadcast plans handle the cases with skewed join keys and left inputs with small sizes naturally, leading to better utilization of computational units compared to those obtained with its hash-hash distribution counterpart in these cases. However, this sort of plan can easily become a scalability bottleneck if the small table needs to be broadcast to a very large number of computational units (e.g., in the case when the right side of the join is very large). Broadcasting the small table can consume substantial resources when the right side of the join is large, since the acts of broadcasting would need to be performed for a very large number of computational units. Moreover the acts of broadcasting to such a large number of computational units incurs a potentially large penalty in the form of interconnect protocol overhead.

Although the aforementioned broadcast distribution is an applicable distribution method in the above mentioned cases, the motivation of this disclosure is to introduce small table replication to improve over the performance of broadcast distribution, especially in the presence of small tables, while under the demands of a very large degree of parallelism (DOP). The herein-below disclosure handles small tables by replicating them using a memory component such as a buffer cache.

As another example, in a system having a single storage unit and multiple computational elements interconnected by a shared common bus, some of the bandwidth of the bus would be used by access protocol to (1) gain access to the bus, (2) send the request for data to the storage unit, (3) receive packets of the requested data, (4) acknowledge receipt of the packets of the requested data, (5) relinquish access to the bus, and (6) perform other protocol-related operations.

In legacy systems, a given computational unit might sequence data access as follows:
 communicate with the storage unit to obtain all or a portion of the left-side table,
 communicate with the storage unit to obtain all or a portion of the right-side table or relation,
 perform the join operation on the obtained portions.

One can observe that for a small table, the cost (e.g., bandwidth, latency) of a unit of overhead to communicate with the storage unit to obtain all or a portion of a table can be even costlier than the cost of moving the table data from the storage unit to the computational unit. Moreover, in practical situations, it frequently happens that a small table is involved in a join operation (e.g., in a left-side table); thus the aggregate cost of the overhead is proportional to the frequency of occurrence. What is needed is a system for reducing overhead in a parallel join distribution plan. Moreover, none of the aforementioned technologies perform the herein-disclosed techniques for replicating a smaller left-side table for performing a join operation with a portion of a larger right-side table or relation in order to reduce data communication protocol overhead. Therefore, there is a need for an improved approach.

SUMMARY

The present disclosure provides an improved method, system, and computer program product suited to address the aforementioned issues with legacy approaches. More specifically, the present disclosure provides a detailed description of techniques used in methods, systems, and computer program products for replicating a smaller left-side table to a portion of a larger right-side table or relation to reduce data communication protocol overhead.

For planning parallelization of a join, a computer implemented method compiles an execution plan for dissemination to a plurality of execution units where the plan combines a smaller left-side table with a portion of a larger right-side table data or relation to reduce system overhead. Upon receiving a request for an inner join operation or an outer join operation (e.g., comprising left-side table data and right-side table data) where the left-side table data is much smaller than the right-side table data, then the method compiles a plan to apportion an entirety of the left-side table data and only a portion of the right-side object to a plurality of computational units. The method continues by sending distribution instructions to respective computational units where the distribution instructions include retrieval of the entirety of the left-side table data with the retrieval of only a portion of the right-side.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

FIG. 1D is a block diagram of a system showing dissemination of a broadcast plan to computational units, according to some embodiments.

FIG. 1E is a block diagram of a system showing dissemination of a replication plan to computational units, according to some embodiments.

FIG. 6 depicts a block diagram of an instance of a computer system suitable for implementing an embodiment of the present disclosure.

DETAILED DESCRIPTION

Some embodiments of the present disclosure address problems attendant to high-throughput, low-overhead parallelized join operations. Some embodiments are directed to an approach for replicating a smaller left-side table to a portion of a larger right-side table to reduce data communication protocol overhead when performing parallelized join operations.

Overview

One possibility to reduce the aggregate cost of plan dissemination and execution overhead is to find a way to eliminate the distribution of a small table to a potentially large number of computational units. One possibility is to replicate the small table to the portion of the (larger) right-side table, and retrieve both the small table and the portion of the (larger) right-side table while incurring only one unit of overhead. Indeed, in exemplary embodiments of systems configured to service parallel queries in multiple computational units, certain operators (e.g., joins) partition the input data by replicating some portions of the tables used in the operation. A plan defines the specific apportioning of portions of the tables used in the operation.

For example, if an input of a join is a small table, one possible plan would be to broadcast the entirety of the small table to all computational units and apportion the other side of the join to respective computational units. Such a situation having a small left-side table and a larger right-side table frequently occurs in data warehousing workloads where the left input is a small dimension table and the right side is a fact table. The act of broadcasting incurs a system cost related to the request and retrieval, movement, and acknowledgement of data, and this cost can be reduced by using a replication plan (see FIG. 1C and FIG. 1E).

Further, in some cases, the cost of broadcasting can be extremely high, and the distribution overhead reduction of a replication plan is very significant. Moreover, in some cases the protocol overhead cost of broadcasting a small table can be high, and can eclipse the system cost of moving the small table, especially in the case of a small table. Further, one can observe that the same or nearly the same protocol overhead cost is incurred again in order to position the portion of the right-side table. One possible plan improvement is to encapsulate the request for the small table within the request for the portion of the right-side table, thus incurring the protocol overhead only one time. That is, the protocol overhead to (1) gain access to the bus, (2) send the request for data to the storage unit, (3) acknowledge individual packets of the requested data, (4) acknowledge receipt of the totality of the requested data (e.g., via a checksum), (5) to relinquish access to the bus, and (6) perform other protocol-related operations is incurred only once.

Figure 1A:
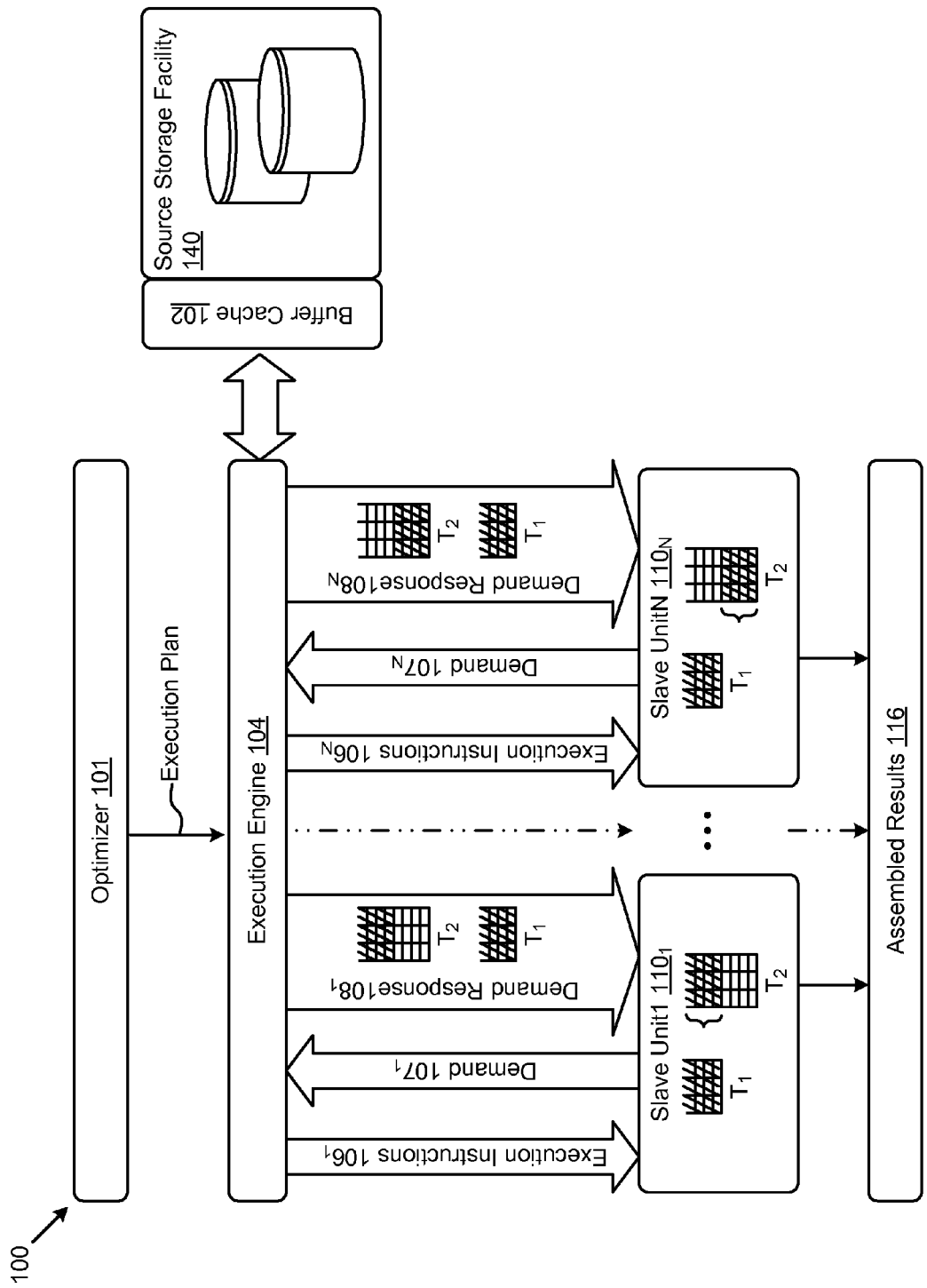
FIG. 1A is a block diagram of a system for replicating a smaller left-side table to a portion of a larger right-side table to reduce data communication protocol overhead, according to some embodiments.

This technique works extremely well in environments with in-memory parallel query execution such as is shown in FIG. 1A. Even more, this technique can be combined with an execution plan that relies on the computational units to request data on demand such as in a pull mode, rather than relying on distribution of data to respective computational units.

Furthermore, the foregoing technique offers fault tolerance support since there is very little overhead in a re-start situation (e.g., since the apportioned portions of the right side of the join are each an atomic, restartable unit of work). Still further, less state needs to be maintained while still supporting fault tolerance.

In legacy systems, execution plans for parallel joins with broadcast distribution require two sets of computational units, namely producer computational units that produce the left input for the join, and the consumer computational units that perform the join. However, as aforementioned, the acts of broadcasting the small table when the right side of the join is large can demand a large set of producer computational units, since the acts of broadcasting would to be performed by a very large number of producer computational units.

Using the small table replication plans as disclosed herein, parallel joins can now be executed using only consumer computational units. Plans with small left-side tables and right deep tree plans are common in online analytical processing (OLAP) workloads.

DEFINITIONS

Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1A is a block diagram of a system 1A00 for replicating a smaller left-side table to a portion of a larger right-side table to reduce data communication protocol overhead. As an option, the present system 1A00 may be implemented in the context of the architecture and functionality of the embodiments described herein. Also, the system 1A00 or any aspect therein may be implemented in any desired environment.

As shown, a table $T_1$ and a portion of a table $T_2$ are positioned in respective computational units (e.g., slave unit1 $110_1$, slave unitN $110_N$). The slave units are configured to perform a join operation on table $T_1$ and at least a portion of table $T_2$, and to send results of the join operation to a module for assembling results (e.g., see assembled results 116).

Prior to any slave units performing any of the aforementioned join operations, an optimizer 101 can receive a request (e.g., a request from a software application), and such a planner/optimizer can architect a plan of how to parallelize the join. The optimizer is configured to compile instruction sets for each individual slave unit such that (a) the instructions sent to one particular slave unit can be performed by the assigned slave unit, such that (b) in aggregate, when all instruction sets have been executed as per the plan, the join operation would be complete, and can be assembled. The instruction sets for each individual slave unit are delivered as execution instructions (e.g., execution instructions $106_1$, execution instructions $106_N$, etc.).

In this embodiment the instructions implement a pull protocol (see FIG. 2B) and accordingly, a particular slave unit can make a demand (e.g., a demand for a table and/or portion of a table) in accordance with the plan. In exemplary cases, the demand is sent from a slave unit to an execution engine 104, which in turn can police access to a source storage facility 140, possibly involving a cache unit (e.g., buffer cache 102).

Now, as earlier indicated, one low-overhead technique replicates a request for a smaller (e.g., left-side) table to a request for a portion of a larger (e.g., right-side) table. Such a replicated request can occur in the form of a demand (e.g., demand $107_1$, demand $107_N$, etc.), and the distributor engine can satisfy a particular demand via a corresponding demand response (e.g., demand response $108_1$, demand response $108_N$, etc.).

In the embodiment shown, the demand response comprises replicated portions of the demanded tables. For example, the demand response $108_1$ comprises table $T_1$ and a portion (the top portion) of table $T_2$. Similarly, the demand response $108_N$ comprises table $T_1$ and a portion (the bottom portion) of table $T_2$.

Figures 1B, 1C:
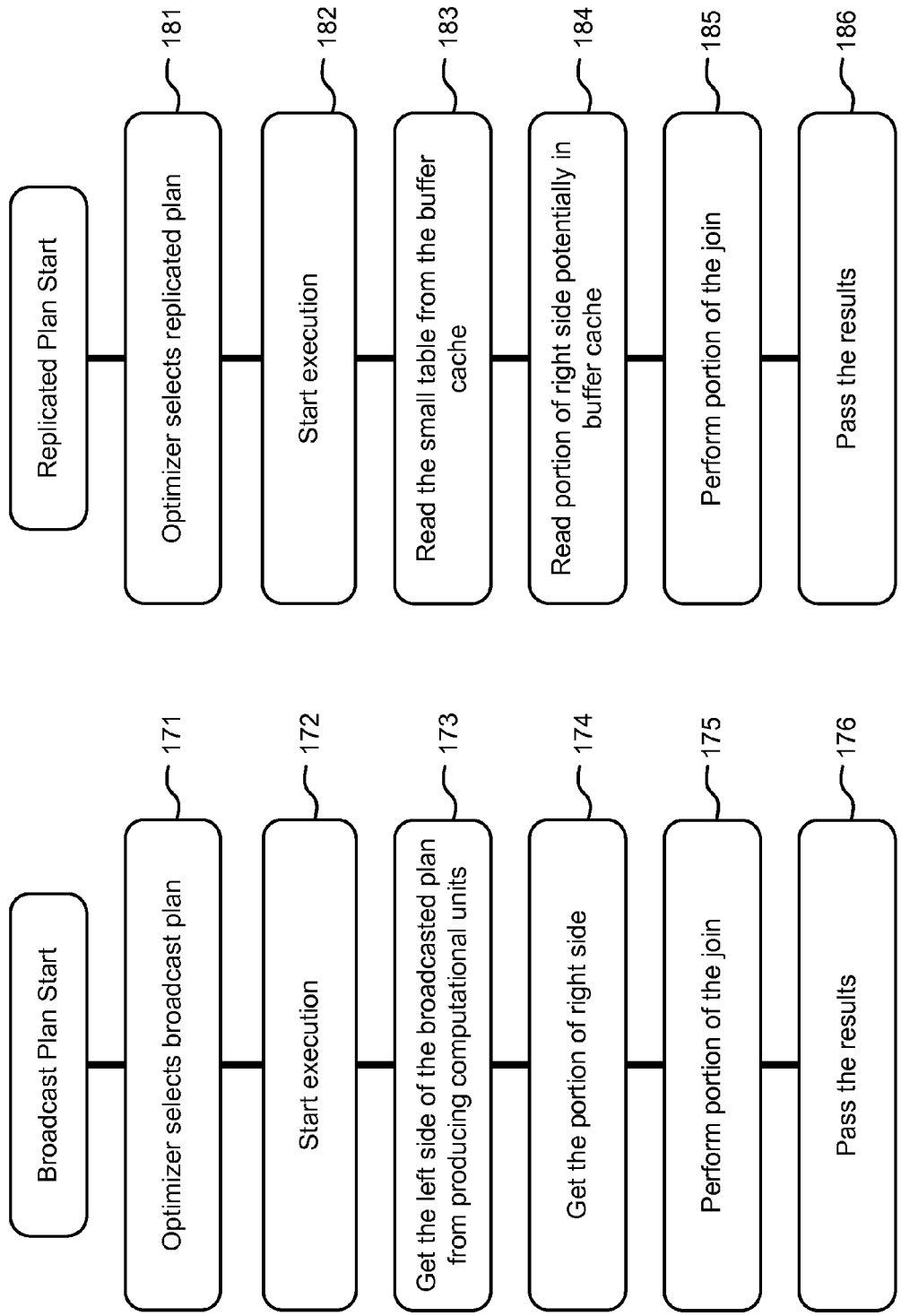
FIG. 1B is a block diagram of a flow showing execution steps for a broadcast plan for distributing tables to computational units, according to some embodiments.
FIG. 1C is a block diagram of a flow showing execution of a small table replication plan for distributing tables to computational units, according to some embodiments.

FIG. 1B is a block diagram of a flow showing execution steps for a broadcast plan.

Following the broadcast plan, an optimizer (e.g., see optimizer 101) determines to apportion the workload to a set of producer execution units, and to a set of consumer execution units (see operation 171). Instructions to carry out the plan (e.g., plan instructions 106) are disseminated to the set of producer execution units, and to the set of consumer execution units, and execution commences (see operation 172). The consumer units and producer units carry out their respective assignments (see operation 173 and operation 174), for example, by accessing the left-side table (see operation 173) and by retrieving a portion of the right-side table (see operation 174). The portion of the join operation that can be performed based on the left-side and portion of the right-side tables is performed (see operation 175) and the results are returned (see operation 176). An exemplary system for performing a broadcast plan is given in FIG. 1D.

FIG. 1C is a block diagram of a flow showing execution of a replication plan.

The replication plan differs from the broadcast plan in several respects as is discussed below. Contrasting the example discussed in the broadcast plan of FIG. 1B, the replication plan commences when an optimizer (e.g., see optimizer 101) determines to devise a plan, and disseminates instructions for the plan to achieve a plan for low-overhead table replication to accomplish the parallelized join operation. As shown, the optimizer selects a replicated plan prior to execution (see operation 181) which in turn apportions the workload to a set of consumer execution units (which apportionment does not require the set of producer execution units). Instructions to carry out the plan are disseminated to the set of consumer execution units, and execution commences (see operation 182). The consumer units carry out their respective assignments (see operation 183 and operation 184). As shown, the replication plan proceeds as a consumer unit accesses the left-side table from the buffer cache 102 (see operation 183) and by retrieving a portion of the right-side table (see operation 184). The portion of the join operation that can be performed based on the left-side and retrieved portion of the right-side tables is performed (see operation 185) and the results are returned (see operation 186). An exemplary system for performing a replicated plan is given in FIG. 1E.

FIG. 1D is a block diagram of a system showing dissemination of a broadcast plan to computational units).

As shown, instructions to carry out the plan are disseminated as plans (e.g., the producer's plan) to the set of producer execution units (e.g., slave unit $110_{T1}$), and as plans (e.g., the consumer's plan) to the set of consumer execution units (e.g., slave unit $110_{T2}$), and execution commences. The join is performed in the consumer execution unit (e.g., slave unit $110_{T2}$) with computational assist from the producer execution units (e.g., slave unit $110_{T1}$). More specifically, the producer units execute a portion of the plan relevant to producing the left-side table input for the join and the consumer units execute the portion of the plan relevant to performing the join and producing the right-side relation input for the join, and the execution units carry out their respective assignments. The join is performed in the consumer execution unit (e.g., slave unit $110_{T2}$).

FIG. 1E is a block diagram of a system showing dissemination of a replication plan to computational units.

As shown, instructions to carry out the plan are disseminated to a set consumer execution units (e.g., slave unit $110_{T2}$). The set of producer execution units is not needed for execution of this replication plan since the join is performed in the consumer execution unit (e.g., slave unit $110_{T2}$) along with producing the left input table data and the right-side relation data without needing assist from producer computational units. That is, instead of reliance on any computational assist from the producer execution units, the join is performed exclusively in the consumer execution units so as to implement the intended low-overhead small table replication for parallelized join operations. More specifically, the consumer units access the left-side table (see workload of slave unit $110_{Replicated}$) and by retrieving a portion of the right side relation (again, see workload of slave unit $110_{Replicated}$). The join is performed exclusively in the consumer execution unit (e.g., slave unit $110_{Replicated}$).

The aspect of demanding and receiving replication of a smaller left-side table to a portion of a larger right-side table serves to reduce data communication protocol overhead. To emphasize the reduction in overhead that is possible when implementing aspects of the present disclosure for low-overhead table replication for parallelized join operations, the following protocols of FIG. 2A and FIG. 2B are compared.

Figure 2A:
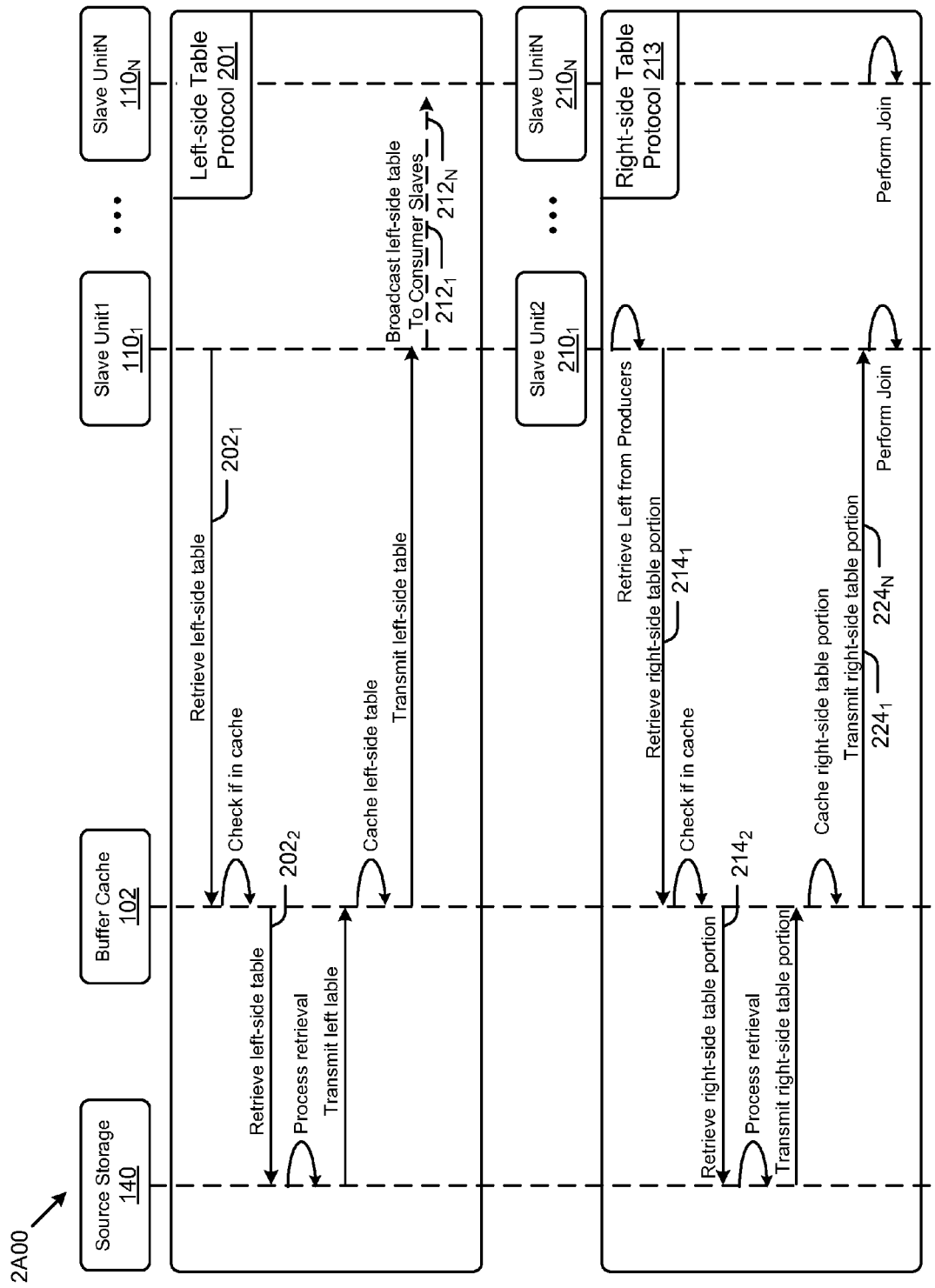
FIG. 2A is a diagram of a push protocol, according to some embodiments.
Figure 2B:
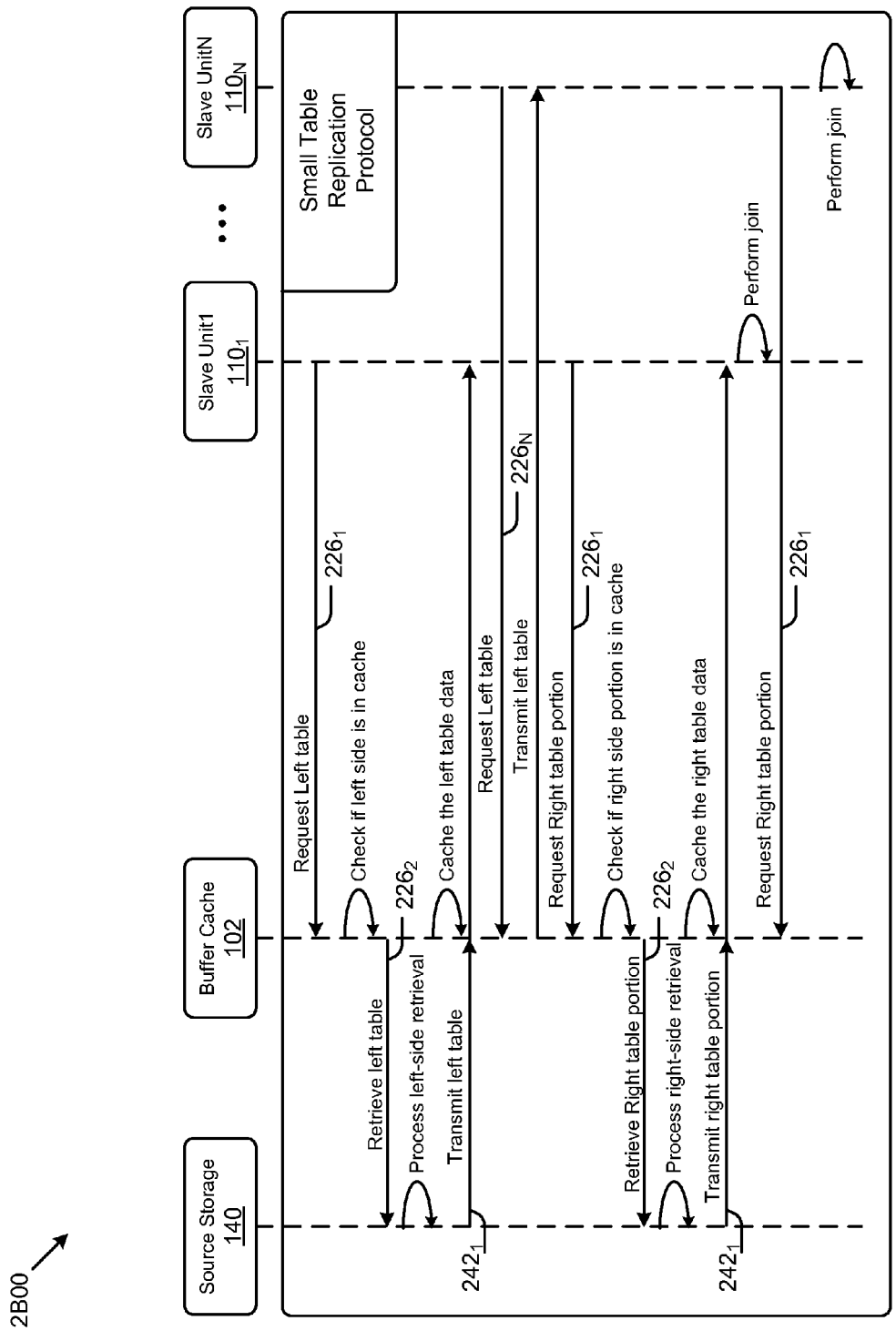
FIG. 2B is a diagram of a small table replication protocol suited for replicating a smaller left-side table to a computational unit handling a portion of a larger right-side table to reduce data communication protocol overhead, according to some embodiments.

FIG. 2A is a diagram of a push protocol 2A00 without replicating a smaller left-side table to a portion of a larger right-side table to reduce data communication protocol overhead. As an option, the present push protocol 2A00 may be implemented in the context of the architecture and functionality of the embodiments described herein. Also, the push protocol 2A00 or any aspect therein may be implemented in any desired environment.

As shown, the slave units are populated with a left-side table (see left-side protocol 201) and the slave units are populated with a right-side table (see right-side protocol 213).

Each aspect of the protocol, including each item incurring protocol overhead is replicated, once for the left side and once for the right side. Each aspect of communication between units and engines (e.g., between slave unit1 . . . slave unitN $110_1$ . . . $110_N$ and the execution engine 104, between the execution engine and the buffer cache 102, and between the buffer cache and the source storage facility 140) is overhead which is replicated, once for the left side and once for the right side.

Figure 3:
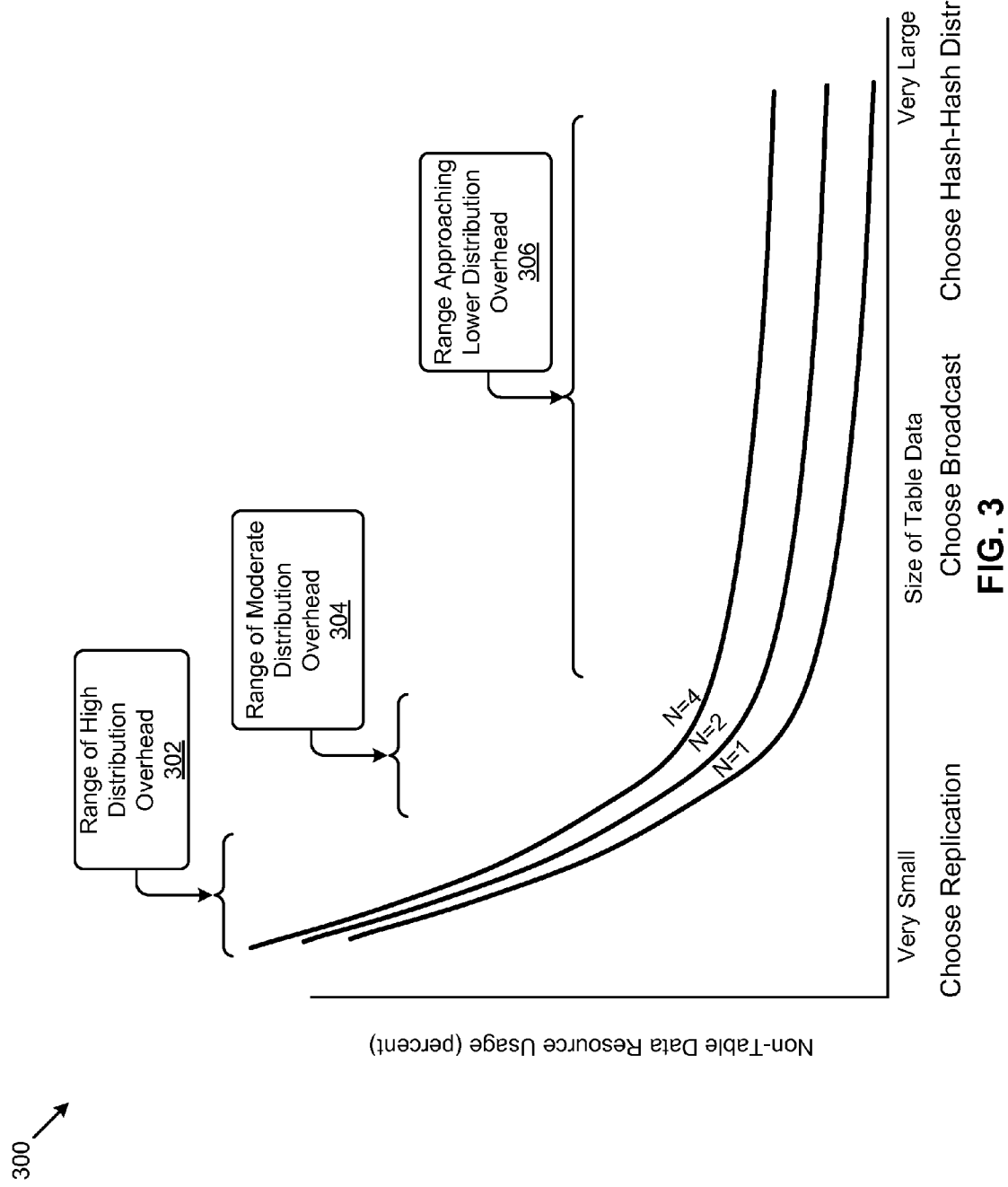
FIG. 3 is a diagram showing protocol overhead ratios that motivate replicating a smaller left-side table to a portion of a larger right-side table to reduce data communication protocol overhead, according to some embodiments.

In certain circumstances (e.g., when a table is small) the protocol overhead accounts for a substantial portion of the total communication cost. This situation is exacerbated when there are more slave units, and is exacerbated as the table being retrieved is small. The curves of FIG. 3 depict usage of non-table bandwidth usage as a function of the size of the data table being retrieved.

To further exemplify protocol uses of bandwidth, consider the following:

the request to retrieve the left-side table from the buffer cache (see message $202_1$) is overhead;
the request to retrieve the left-side table from source storage (see message $202_2$) is overhead;
the message to broadcast the left-side table to slave unit1 incurs overhead (see broadcast message $212_1$);
the message to broadcast the left-side table to slave unitN incurs overhead (see broadcast message $212_N$);
the request to retrieve the right-side table from the buffer cache (see message $214_1$) is overhead;
the request to retrieve the right-side table from source storage (see message $214_2$) is overhead;
the message to transmit the right-side table to slave unit 1 incurs overhead (see distribute message $224_1$);
the message to distribute the right-side table to slave unit N incurs overhead (see distribute message $224_N$);

As can be now appreciated, the protocol of FIG. 2A uses two units of protocol overhead, and the overhead could be reduced in half if there were a technique suited for retrieving more table data using only one unit of protocol overhead.

FIG. 2B is a diagram of a small table replication protocol suited for replicating a smaller left-side table to a computational unit handling a portion of a larger right-side table to reduce data communication protocol overhead. As an option, the present low-overhead protocol 2B00 may be implemented in the context of the architecture and functionality of the embodiments described herein. Also, the low-overhead protocol 2B00 or any aspect therein may be implemented in any desired environment.

As shown, if the smaller table (e.g., a left-side table) is replicated with requests for a portion of a larger table (e.g., portion of a right-side table) then the data communication protocol overhead is reduced.

FIG. 3 is a diagram 300 showing protocol overhead ratios that motivate replicating a smaller left-side table to a portion of a larger right-side table to reduce data communication protocol overhead. As an option, the present diagram 300 may be implemented in the context of the architecture and functionality of the embodiments described herein. Also, the diagram 300 or any aspect therein may be implemented in any desired environment.

As shown, the protocol overhead for row distribution is very high when the size of a requested table is small. Conversely, the protocol overhead for row distribution gets successively lower, approaching zero percent as the size of a requested table increases. Moreover, in embodiments with multiple execution units, since each execution unit needs to position at least some portions of both the left side and the right side of the join, the aggregate overhead increases with the number of computational units.

The figure depicts a range of extremely high overhead 302, a range of high overhead 304, and a range that is lower overhead, approaching zero as the table size becomes extremely large (see range approaching lower overhead 306). For example an optimization phase in the compilation can calculate the cardinality of the left-side table data and can calculate the ratio of the left-side table data to the size of a buffer cache when selecting a plan with replication.

Additional Embodiments of the Disclosure

Figure 4:
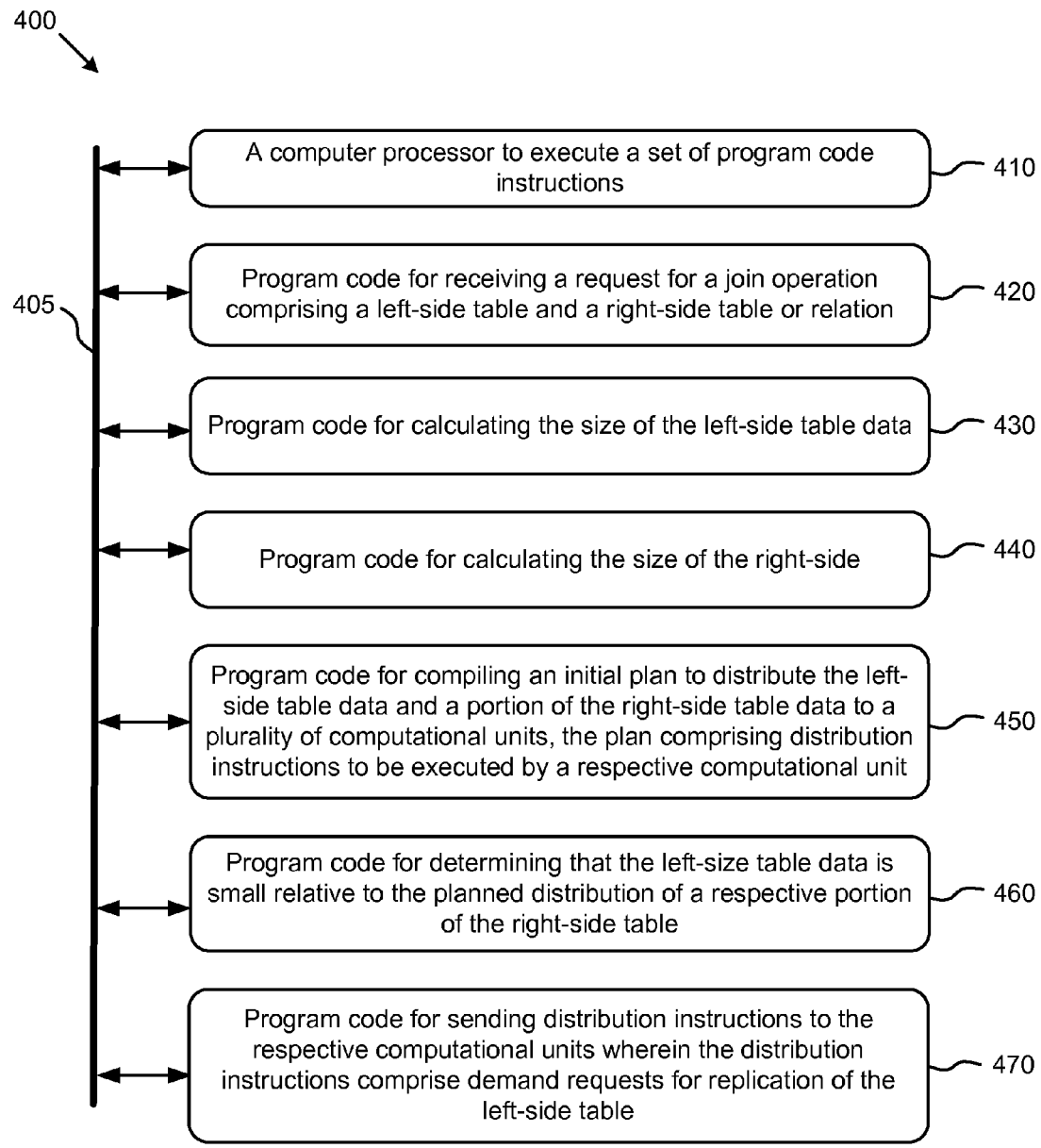
FIG. 4 is a block diagram of a system for replicating a smaller left-side table to a portion of a larger right-side table to reduce data communication protocol overhead, according to some embodiments.

FIG. 4 depicts a flow chart of a system for replicating a smaller left-side table to a portion of a larger right-side table to reduce data communication protocol overhead. As an option, the present system 400 may be implemented in the context of the architecture and functionality of the embodiments described herein. Of course, however, the system 400 or any operation therein may be carried out in any desired environment.

As shown, system 400 comprises at least one processor and at least one memory, the memory serving to store program instructions corresponding to the operations of the system. As shown, an operation can be implemented in whole or in part using program instructions accessible by a module. The modules are connected to a communication path 405, and any operation can communicate with other operations over communication path 405. The modules of the system can, individually or in combination, perform method operations within system 400. Any operations performed within system 400 may be performed in any order unless as may be specified in the claims.

The embodiment of FIG. 4 implements a portion of a computer system, shown as system 400, comprising a computer processor to execute a set of program code instructions (see module 410) and modules for accessing memory to hold program code instructions to perform: receiving a request for a join operation comprising a left-side table and a right-side table (see module 420); calculating the size of the left-side table data (see module 430); calculating the size of the right-side table data (see module 440); compiling an initial plan to distribute the left-side table data and a portion of the right-side table data to a plurality of computational units, the plan comprising distribution instructions to be executed by a respective computational unit (see module 450); determining that the left-size table data is small relative to the planned distribution of a respective portion of the right-side table (see module 460); and sending distribution instructions to the respective computational units wherein the distribution instructions comprise demand requests for replication of the left-side table (see module 470).

Figure 5:
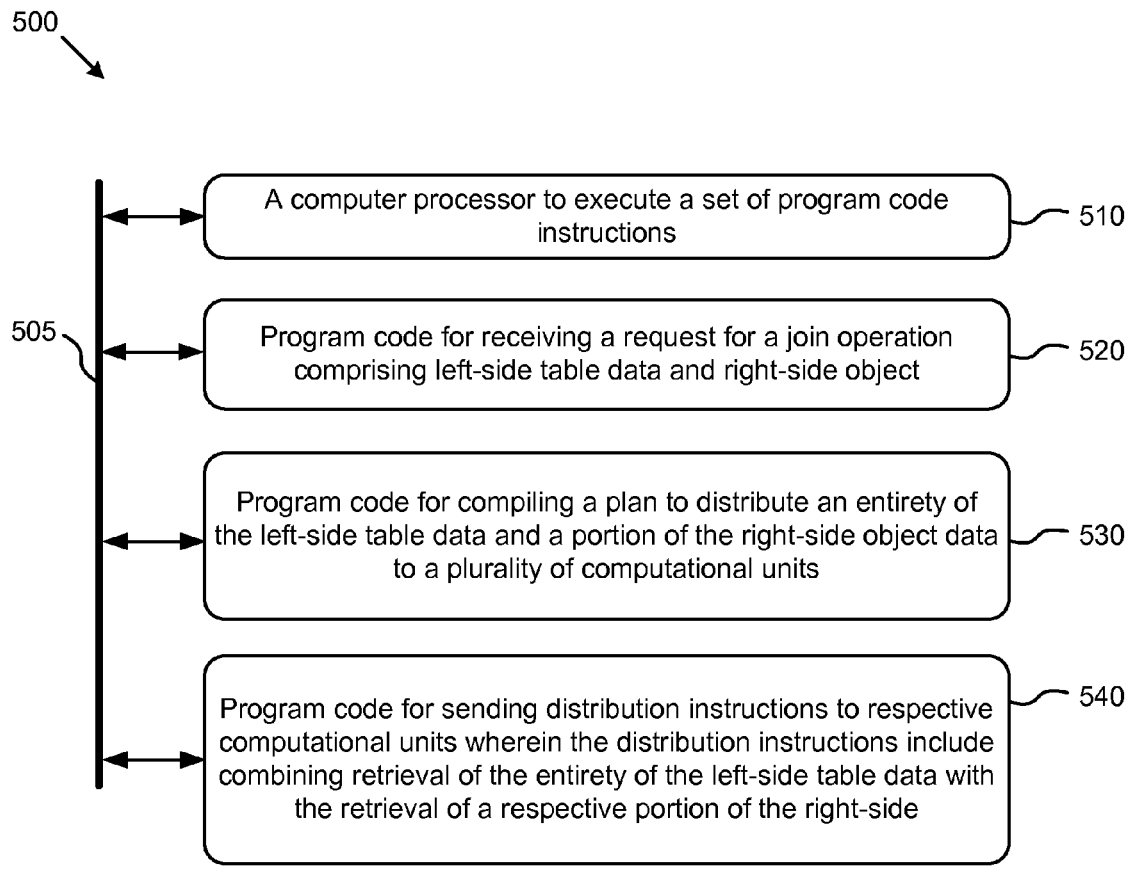
FIG. 5 exemplifies a block diagram of a system for replicating a smaller left-side table to a portion of a larger right-side table to reduce data communication protocol overhead, according to some embodiments.

FIG. 5 depicts a block diagram of a system to perform operations for replicating a smaller left-side table with a portion of a larger right-side table to reduce overhead. As an option, the present system 500 may be implemented in the context of the architecture and functionality of the embodiments described herein. Of course, however, the system 500 or any operation therein may be carried out in any desired environment.

As shown, system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims. The embodiment of FIG. 5 implements a portion of a computer system, shown as system 500, comprising a computer processor to execute a set of program code instructions (see module 510) and modules for accessing memory to hold program code instructions to perform: receiving a request for a join operation comprising left-side table data and right-side table data (see module 520); compiling a plan to distribute an entirety of the left-side table data and a portion of the right-side table data to a plurality of computational units (see module 530); and sending distribution instructions to respective computational units wherein the distribution instructions include combining retrieval of the entirety of the left-side table data with the retrieval of a respective portion of the right-side table data (see module 540).

System Architecture Overview

FIG. 6 depicts a block diagram of an instance of a computer system 600 suitable for implementing an embodiment of the present disclosure. Computer system 600 includes a bus 606 or other communication mechanism for communicating information, which interconnects subsystems and devices, such as a processor 607, a system memory 608 (e.g., RAM), a static storage device (e.g., ROM 609), a disk drive 610 (e.g., magnetic or optical), a data interface 633, a communication interface 614 (e.g., modem or Ethernet card), a display 611 (e.g., CRT or LCD), input devices 612 (e.g., keyboard, cursor control), and an external data repository 631.

According to one embodiment of the disclosure, computer system 600 performs specific operations by processor 607 executing one or more sequences of one or more instructions contained in system memory 608. Such instructions may be read into system memory 608 from another computer readable/usable medium, such as a static storage device or a disk drive 610. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 600. According to certain embodiments of the disclosure, two or more computer systems 600 coupled by a communications link 615 (e.g., LAN, PTSN, or wireless network) may perform the sequence of instructions required to practice the disclosure in coordination with one another.

Computer system 600 may transmit and receive messages, data, and instructions, including programs (e.g., application code), through communications link 615 and communication interface 614. Received program code may be executed by processor 607 as it is received, and/or stored in disk drive 610 or other non-volatile storage for later execution. Computer system 600 may communicate through a data interface 633 to a database 632 on an external data repository 631. A module as used herein can be implemented using any mix of any portions of the system memory 608, and any extent of hard-wired circuitry including hard-wired circuitry embodied as a processor 607.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for planning parallelization of a distributed join having a smaller left-side and a larger right-side, the method comprising:
   receiving a request for a join operation comprising a left-side table and a right-side table;
   calculating relative sizes of the left-side table compared to the right-side table;
   determining that the left-side table has a relatively smaller size as compared to the right-side table;
   identifying overhead associated with the join operation, the overhead determined by:
      identifying a frequency of moving data in the left-side table to a computational unit of a plurality of computation units;
      identifying a size of the left-side table;
      calculating the overhead from consideration of both the frequency of moving the data in the left-side table and the size of the left-side table;
   determining whether to broadcast or to replicate the left-side table to the plurality of computational units based in part or in whole upon the overhead; and
   compiling, prior to execution within the plurality of computational units, a plan to broadcast or to replicate an entirety of the left-side table and to transmit a portion of the right-side table to the plurality of computational units based at least in part upon a result of determining whether to broadcast or to replicate the left-side table.

2. The method of claim 1, further comprising calculating a cardinality of the left-side table data.

3. The method of claim 1, further comprising calculating a ratio of the left-side table to the size of a buffer cache.

4. The method of claim 1, the entirety of the left-side table is stored in a buffer cache.

5. The method of claim 1, wherein the join operation corresponds to an outer join that comprises rows matching from both left-side table data and right-side table data and non-matching rows from an outer side.

6. The method of claim 1, wherein the overhead comprises protocol overhead.

7. The method of claim 6, further comprising:
   determining a second overhead for transmitting the portion of the right-side table; and
   determining whether to broadcast or replicate the left-side table based in part or in whole upon comparing the protocol overhead with the second overhead.

8. A computer system for planning parallelization of a distributed join having a smaller left-side and a larger right-side, comprising:
   a computer processor to execute a set of program code instructions; and
   a memory to hold the program code instructions, in which the program code instructions comprises program code which, when executed by the computer processor, causes the computer processor to:
   receive a request for a join operation comprising left-side table and a right-side table;
   calculate relative sizes of the left-side table compared to the right-side table;
   determine that the left-side table has a relatively smaller size as compared to the right-side table;
   identify overhead associated with the join operation, the overhead determined by:
      identifying a frequency of moving data in the left-side table to a computational unit of a plurality of computation units;
      identifying a size of the left-side table;
      calculating the overhead from consideration of both the frequency of moving the data in the left-side table and the size of the left-side table;
   determine whether to broadcast or to replicate the left-side table to the plurality of computational units based in part or in whole upon the overhead; and
   compile, prior to execution within the plurality of computational units, a plan to broadcast or replicate an entirety of the left-side table and to transmit a portion of the right-side table to the plurality of computational units based at least in part upon a result of determining whether to broadcast or to replicate the left-side table.

9. The computer system of claim 8, the program code instructions further comprising program code for calculating a cardinality of the left-side table data.

10. The computer system of claim 8, the program code instructions further comprising program code for calculating a ratio of the left-side table data to the size of a buffer cache.

11. The computer system of claim 8, the program code instructions further comprising program code for sending distribution instructions to respective computational units to execute the plan.

12. The computer system of claim 8, wherein the join operation comprises rows matching from both left-side table data and right-side table data and non-matching rows from an outer side.

13. The computer system of claim 8, wherein the overhead comprises protocol overhead.

14. The computer system of claim 8, wherein the entirety of the left-side table is stored in a buffer cache.

15. A computer program product embodied in a non-transitory computer readable medium, the non-transitory computer readable medium having stored thereon a sequence of instructions which, when executed by a processor causes the processor to execute operations for planning parallelization of a distributed join having a smaller left-side and a larger right-side, the operations comprising:
   receiving a request for join operation comprising left-side table and a right-side table;
   calculating relative sizes of the left-side table compared to the right-side table;
   determining that the left-side table has a relatively smaller size as compared to the right-side table;
   identifying overhead associated with the join operation, the overhead determined by:
      identifying a frequency of moving data in the left-side table to a computational unit of a plurality of computation units;
      identifying a size of the left-side table;
      calculating the overhead from consideration of both the frequency of moving the data in the left-side table and the size of the left-side table;
   determining whether to broadcast or to replicate the left-side table to the plurality of computational units based in part or in whole upon the overhead; and
   compiling, prior to execution within the plurality of computational units, a plan to broadcast or to replicate an entirety of the left-side table and to transmit a portion of the right-side table to the plurality of computational units based at least in part upon a result of determining whether to broadcast or to replicate the left-side table.

16. The computer program product of claim 15, the operations further comprising calculating a cardinality of the left-side table data.

17. The computer program product of claim 15, the operations further comprising calculating a ratio of the left-side table data to the size of a buffer cache.

18. The computer program product of claim 15, the operations further comprising sending distribution instructions to respective computational units to execute the plan.

19. The computer program product of claim 15, wherein the join operation comprises rows matching from both left-side table data and right-side table data and non-matching rows from an outer side.

20. The computer program product of claim 15, wherein the overhead comprises protocol overhead.

* * * * *